(12) United States Patent
Jaspers

(10) Patent No.: US 7,847,842 B2
(45) Date of Patent: *Dec. 7, 2010

(54) PREVENTING GREEN NON-UNIFORMITY IN IMAGE SENSORS

(75) Inventor: Cornelis Antonie Maria Jaspers, Eindhoven (NL)

(73) Assignee: IPG Electronics 503 Limited (NL)

( * ) Notice: Subject to any disclaimer, the term of this patent is extended or adjusted under 35 U.S.C. 154(b) by 1563 days.

This patent is subject to a terminal disclaimer.

(21) Appl. No.: 11/120,587

(22) Filed: May 3, 2005

(65) Prior Publication Data

US 2005/0195299 A1 Sep. 8, 2005

Related U.S. Application Data

(63) Continuation of application No. 10/067,283, filed on Feb. 5, 2002, now Pat. No. 6,944,337.

(30) Foreign Application Priority Data

Feb. 6, 2001 (EP) ................... 01200423

(51) Int. Cl.
*H04N 5/208* (2006.01)

(52) U.S. Cl. ............ 348/252; 348/241; 382/266
(58) Field of Classification Search ......... 348/342, 348/343, 340
See application file for complete search history.

(56) References Cited

U.S. PATENT DOCUMENTS 5,285,267 A    2/1994  Lim ............... 348/663
6,944,337 B2 *  9/2005  Jaspers ............ 382/167

FOREIGN PATENT DOCUMENTS

WO    WO 9904554 A2 *  1/1999
WO    WO 9904555 A2 *  1/1999
WO    WO 9939509 A1 *  8/1999

* cited by examiner

*Primary Examiner*—Jason Whipkey
*Assistant Examiner*—Dennis Hogue
(74) *Attorney, Agent, or Firm*—Volpe & Koenig, P.C.

(57) ABSTRACT

The present invention relates to digital image sensors and in particular to contour filters (ZSB, 7) preventing green non-uniformity in the contour signal of the RGB Bayer image sensors. A set of rules is specified for designing the filter coefficients in the filter, whereby green non-uniformity is prevented.

10 Claims, 10 Drawing Sheets

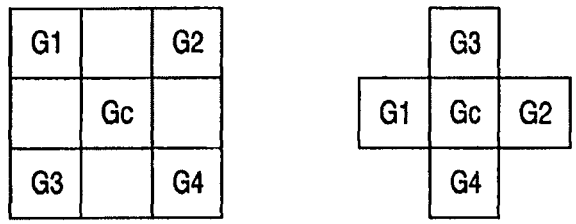
FIG. 1 (Prior Art)
FIG. 2 (Prior Art)
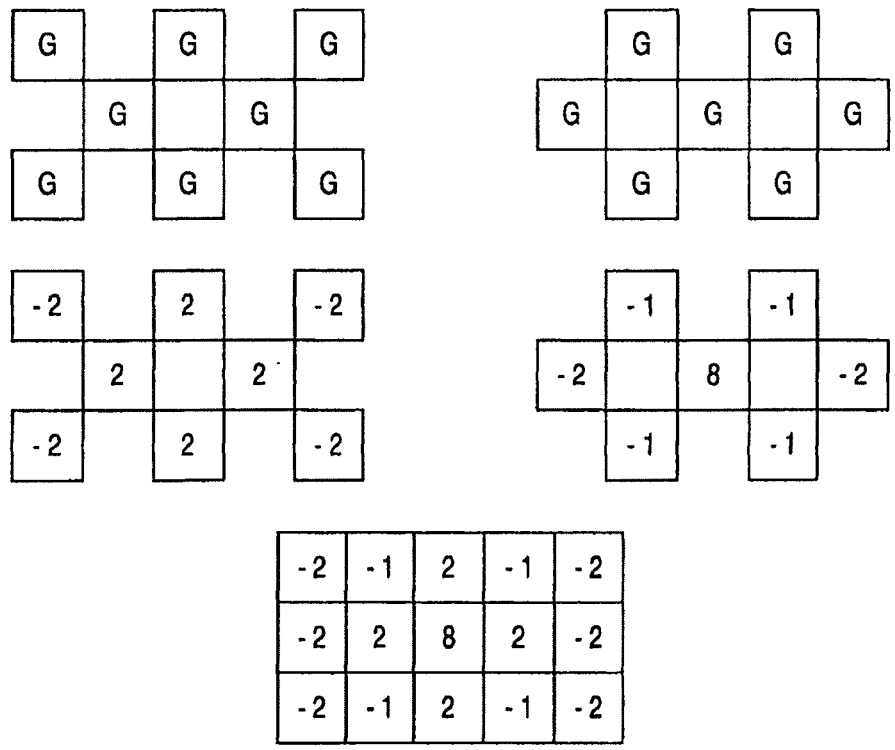
FIG. 3 (Prior Art)

PREVENTING GREEN NON-UNIFORMITY IN IMAGE SENSORS

This is a Continuation of Application Ser. No. 10/067,283, filed Feb. 5, 2002 now U.S. Pat. No. 6,944,337.

FIELD OF INVENTION

The present invention relates to digital image sensors and in particular to contour filters preventing green non-uniformity in the contour signal of the RGB Bayer image sensors.

BACKGROUND OF THE INVENTION

In digital cameras a lens is used to obtain light information from a scene. This light information is converted to electrons by an image sensor having an array of light sensitive elements. When using digital RGB still cameras, three image sensors are used to obtain color sensing for each color red, green and blue. In order to reduce both cost and size of the camera it is possible to use one image sensor having an RGB Bayer filter array, where each pixel in the sensor array senses red, green or blue in a predefined pattern. This pattern is build up of alternating green, red columns and green, blue columns. When using one image sensor to sense all three colors it is necessary to reconstruct the missing pixels before the total image is represented.

When using RGB Bayer sensors so-called green non-uniformity or green-green differences are introduced, because of the differently colored neighbors of a green pixel. In the vertical direction of a 'red' column a green pixel has only red colors as a neighbor, while in 'blue' column green has only blue neighbor pixels. Depending on the quality of the vertical color separation of the sensor, the green pixels can be modulated by the red and blue pixels due to the electron charge in the silicon layer or light crosstalk in the color filter layer. If so, then for certain colored scenes this will result in a column wise green non-uniformity.

In FIG. 1 an example of the green-green differences is shown according to the above description and it is shown how the column wise modulation of green by the red and blue pixels appears. In FIG. 1, this difference is illustrated as a normal G, and an italic and bold G. In the image signal this can be compensated for when reconstructing the green pixel using some special reconstruction methods.

A method of restoring green uniformity in a reconstructed green signal is described in the following. In case of an RGB reconstruction with two row delays, FIG. 2 shows the declaration of the surrounding green pixels if green is present (left) or absent (right). In the latter case the missing green pixel Gc is the reconstructed (smart) green value of the RGB reconstruction filter. The amount of green non-uniformity depends on the design of the image sensor. For the Philips FT sensors the maximum is about 5% of the green signal amplitude. This level will be mentioned in the 'Gnonuniformlevel' and should be adjustable by means of the core of the camera processing.

An algorithm for green uniformity restoration is:

```
if presence of Green then
begin
sigmaG = (G1+G2+G3+G4)/4
if abs(sigmaG−Gc) < Gnonuniformlevel {subtract sum of pixels
and center pixel}
then Green = (Gc+sigmaG)/2 {the average green value of 5 pixels}
end
else if absence of green then
begin
sigmaG = (G1+G2+G3+G4)/4
if abs((G1+G2−G3−G4)/2) < Gnonuniformlevel {subtract horizontal
and vertical pixels}
then Green = sigmaG {the average green value of 4 pixels}
else Green = Gc (the reconstructed green)
end
```

The result of this algorithm is that the green uniformity is restored in the reconstructed signal in such a way that no regular pattern due to the green non-uniformity is visible and that for signal variations above the Gnonuniformlevel no resolution loss will occur. Below that level the center green pixel is replaced by the averaged green value of all present green pixels.

Contour filtering is another important part of image processing, by contour filtering a contour signal is obtained from the contour information of the image. This signal can afterwards be applied to the reconstructed image signal whereby the contours of the image are amplified. In practical use a contour amplification of an image results in a sharper image.

Digital still color cameras with an RGB Bayer color filter array can be equipped with a two-dimensional (2D) contour filter which is acting parallel to the RGB color reconstruction. The advantage of this method is that contour processing after the reconstruction of the RGB signals has become superfluous. Parallel contour processing is especially of interest for low cost applications. No extra row delays are needed for the two-dimensional contour signal because with the very same row delays as applied for the RGB color reconstruction, the contour signal is achieved from the green color only.

Therefore in order to get the best result the green uniformity should not only be restored in the reconstructed data as described above, but green non-uniformity should also be removed from the parallel contour signal.

First the basics of parallel contour processing will be explained. The most important aspect of parallel contour filtering for RGB Bayer image sensors is the so-called zero switch box. The serial RG signal, or GB signal in the next row of the sensor, is de-multiplexed into three RGB signals with zeros on the missing color location.

So the red signal becomes:

| R | 0 | R | 0 | R |
|---|---|---|---|---|
| 0 | 0 | 0 | 0 | 0 |
| R | 0 | R | 0 | R |
| 0 | 0 | 0 | 0 | 0 |

The blue signal becomes:

| 0 | 0 | 0 | 0 | 0 |
|---|---|---|---|---|
| 0 | B | 0 | B | 0 |
| 0 | 0 | 0 | 0 | 0 |
| 0 | B | 0 | B | 0 |

And the green signal:

| 0 | G | 0 | G | 0 |
|---|---|---|---|---|
| G | 0 | G | 0 | G |
| 0 | G | 0 | G | 0 |
| G | 0 | G | 0 | G |

Each of those signals can now easily be filtered with ordinary Laplacian filters. In FIG. 3 an example is given how the filter coefficients relate to the presence or absence of center green pixels for an arbitrary 5×3 contour signal. At the bottom of FIG. 3, the coefficients of the total 5×3 filter is shown. At the top left the 5×3 zero switched green pattern with center green absent is shown and below the corresponding filter coefficients. At the top right the 5×3 zero switched green pattern with center green present is shown and below the corresponding filter coefficients.

It is important that the combination of both filters leads to a minimum of distortion in the contour signal. In many cases this can be achieved by determining the coefficients in such a way that the sum of the positive (or negative) coefficients for center green absent, and for center green present, are equal.

SUMMARY OF THE INVENTION

It is an object of the present invention to provide filters for use in contour processing that prevents green-green differences in the contour signal and a further object is that the filters further creates a contour signal with a minimum of distortion. To this end, the invention provides a contour filtering as defined in the independent claims. Advantageous embodiments are defined in the dependent claims.

In the present context, the pixel vales may, naturally, be provided in any form or order. The important factor is that they may be ordered and represented in a manner so that an array is provided representing the image.

Also, it should be noted that the zero switching needs not be a replacement with a value being exactly zero. A value being substantially smaller than the absolute value of remaining non-zero filter coefficients will normally suffice. However, the value of zero is normally desired—also due to the fact that natural numbers smaller than 10 are normally used as filter coefficients.

The so-called Bayer sensor is widely used in digital cameras, whereby the filter preferably comprises means for receiving the array of filter values from a CCD sensor comprising an RGB Bayer sensor. In fact, the filter may actually comprise the Bayer sensor. Alternatively, the filter may comprise means for receiving the array of filter values from a CCD sensor comprising a YeGCy Bayer sensor.

The filter may also comprise means for performing an interpolation of missing color pixels in parallel with the filtering. In this manner, additional functionality is obtained without loosing processing speed. The interpolation process is a process where e.g. the "amount" of the first color (intensity) at positions of the array of pixel values of the second color(s) is interpolated from pixel values of the first group. Additionally or alternatively, the intensity at a pixel of the second group of light not transmitted by the filter at that pixel may by other pixel values relating to filters transmitting that color. Thus, less row delays are required, resulting in a reduction of the required amount of memory and thereby a reduction of cost.

In a preferred embodiment, the noise of the two separate filters comprising each of the first and second filter coefficients has been matched. Thereby, the total filter comprising both the first and second filter has a uniform noise contribution. In a specific embodiment, the noise is matched by adjusting the coring level of each of the filters.

In a preferred embodiment, the first group of pixels consists of every second pixel in each row and column of the array of pixel values, and the first and second filter arrays are combined to a single filter array where the first and second arrays have the same dimensions, for each position of the first and second arrays, apart from the predetermined position, at least one of the first and second array has a filter coefficient being at least substantially zero, the single array having dimensions equal to those of the first and second arrays, and the filter coefficient of each position of the single array being the sum of the corresponding coefficients of the first and second arrays.

In this manner, the single array may virtually be positioned with its predetermined position over a pixel to be filtered, whereafter the filter values of the single array are multiplied with the corresponding pixel values and finally summed to give a filtered pixel value. It is clear that this use of the single array corresponds exactly to the use of the two arrays when the array of pixel values has the above form—corresponding to that of an image taken with a Bayer sensor.

By the preferred filtering coefficients set out in a dependent claim, contour information is provided where the green-green difference is avoided.

The invention further comprises a computer program comprising computer program code means adapted to perform all the steps of the method mentioned above when said program is run on a computer and a computer readable medium comprising the computer program.

These and other aspects of the invention will be apparent from and elucidated with reference to the embodiments described hereinafter.

BRIEF DESCRIPTION OF THE DRAWINGS

In the drawings,

FIG. 1 shows an example of the column-wise modulation in the RGB Bayer image sensor;

FIG. 2 shows the declaration of surrounding green pixels, when restoring green uniformity;

FIG. 3 shows an example of how the filter coefficients relate to the presence or absence of center green pixels for an arbitrary 5×3 contour signal;

FIG. 7 shows the fulfillment of rule 2 for a 5×5 array;

FIG. 9 shows the fulfillment of rule 2 for a second 5×5 array;

FIG. 11 shows the fulfillment of rule 2 for a third 5×5 array;

FIG. 13 shows the fulfillment of the extended rule 2 for a 5×5 array;

DESCRIPTION OF PREFERRED EMBODIMENTS

According to the present invention it has been found that some rules have to be fulfilled when designing parallel contour filter coefficients in order to achieve a contour signal without green-green differences having a minimum of distortion in that contour. The filter can be divided into two parts, a first array of filter coefficients which filters the zero switched green color when center green is present, and a second array of filter coefficients which filters the zero switched green color when center green is absent.

The rules are as follows:

1. The center coefficient in both the first array of filter coefficients and the second array of filter coefficients is zero. The center green data is added to the filter later by using the green signal of the reconstruction path. That center green already has a restored green uniformity as has been explained above.

2. The subtraction of neighboring diagonal filter coefficients in each of the first and second array of filter coefficients results in a zero contribution. In general terms this can also be expressed as follows: When the filter coefficients of the array are divided into a number of disjoint groups of diagonal coefficients where said disjoint groups are symmetrical around a center coefficient of the array, a filter coefficient exists in each group, which equals the sum of the remaining filter coefficients in the group.

This will average and as a consequence eliminate the green-green differences of the green pixels with vertical red and blue neighbors.

After the two filters have been determined, one for center green present and one for center green absent, the combination of both filters should be checked in order to achieve a minimum of distortion. First their amplitude transfer should be checked and if necessary adapted for a minimal distortion in the total contour signal. Then their amount of noise reduction by means of coring should possibly be matched by adjusting the coring level of each filter.

It should be noticed that in designing the filter coefficients, it is the ratio between the coefficients that is important, therefore any filter fulfilling the above rules can be multiplied by any factor.

In the following, some filters will be designed and tested according to the above mentioned rules. First an example of a 5×2, single row, parallel contour filter without green-green differences is shown.

Weights for green absent

| −1 | −0 | −0 | −0 | −1 |
|----|----|----|----|----|
| −0 | −1 | −0 | −1 | −0 | sigmawCR=4.

Weights for green present

| −0 | −1 | −0 | −1 | −0 |
|----|----|----|----|----|
| −1 | −0 | −0 | −0 | −1 | sigmawCR=4 where sigmawCR is the absolute value of the sum of the coefficients and it is the factor by which the signal output of the contour filter has to be divided in order to achieve an almost unity signal amplitude.

Figure 4:
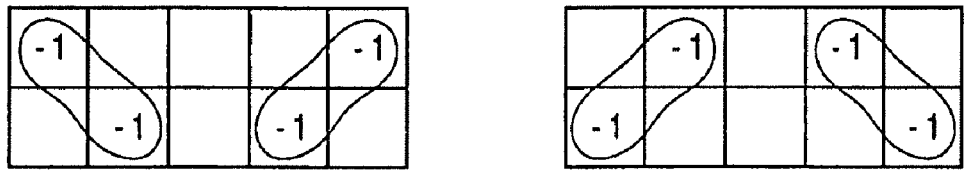
FIG. 4 shows the fulfillment of rule 2 for a 5×2 array.

As shown in FIG. 4, the filter fulfils rule 1 and 2. No center coefficients (location indicated by a black dot) are present in both the filter coefficients for center green present (left) and center green absent (right), and by subtracting diagonal neighboring coefficients in both the coefficients for center green present and center green absent, a zero contribution is obtained. In FIG. 4, the picture at the middle shows the coefficients of the total picture.

The combination of both filters is then checked by simulations with the aid of a zone plate scene and this results in two filters with an acceptable minimum of distortion. The test showed that the vertical contour is somewhat lower than the horizontal one. The noise behavior of both filters, which was tested with a specific color bar scene, is such that an individual coring level is not needed.

An example of a 5×3 parallel contour filter without green-green differences is shown below.

Weights for green absent

| −1 | −0 | −1 | −0 | −1 |
|----|----|----|----|----|
| −0 | −3 | −0 | −3 | −0 |
| −1 | −0 | −1 | −0 | −1 |

SigmawCR=12.

Weights for green present

| −0 | −1 | −0 | −1 | −0 |
|----|----|----|----|----|
| −2 | −0 | −0 | −0 | −2 |
| −0 | −1 | −0 | −1 | −0 | sigmawCR=8

The absolute value of the sum of the coefficients (sigmawCR) of both filters do not match. Hence the total weight has to be adapted to 24, resulting in the following filter coefficients.

Weights for green absent

| −2 | −0 | −2 | −0 | −2 |
|----|----|----|----|----|
| −0 | −6 | −0 | −6 | −0 |
| −2 | −0 | −2 | −0 | −2 |

SigmawCR=24.

Weights for green present

| −0 | −3 | −0 | −3 | −0 |
|----|----|----|----|----|
| −6 | −0 | −0 | −0 | −6 |
| −0 | −3 | −0 | −3 | −0 | sigmawCR=24.

Figure 5:
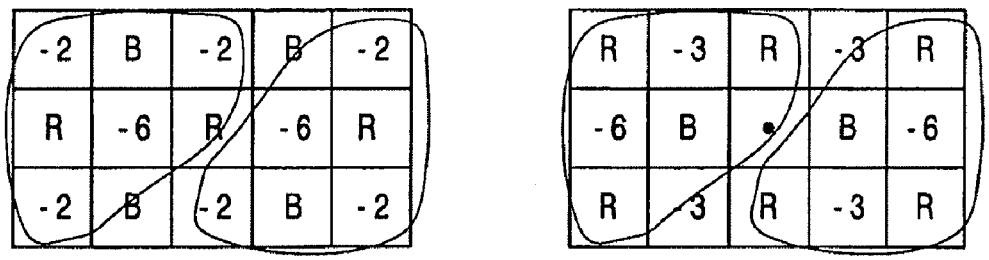
FIG. 5 shows the fulfillment of rule 2 for a 5×3 array.

In FIG. 5, with the various sub-pictures showing the same situations as in FIG. 4, fulfillment of rule 2 is tested. For the fulfillment of rule 2, in case of absence of green, 3 pixels with a coefficient of −2 and in this example a red vertical neighbor are subtracted from a single diagonal one with a coefficient of −6 and a blue (B) vertical neighbor. The result is, as desired by rule 2, zero, which eliminates the green-green differences.

For the presence of center green, two pixels with a coefficient of −3 and a blue vertical neighbor are subtracted from a single diagonal one with a coefficient of −6 and a red (R) vertical neighbor. Also here the result of the subtraction is zero.

Checking the combination made it clear that there is a problem with this rather unique 5×3 parallel contour filter. The amplitudes of both filters differ too much and require some adaptation of the filter in case green is absent in order to minimize the distortion. Moreover some adaptation for an equal noise reduction by means of coring is needed. As a consequence, in case of absence of green, first the coring level has to be increased 1.4 times, and then the contour signal amplitude has to be multiplied three times.

In a software code this results in the following.

Declaration of parameters:

contour*: the parallel contour signal via the Laplacian filter of FIG. 5 without center green, achieved via the Laplacian reconstruction block and its zero switch box contour_a/p: the contour signal after coring and gain adaptation for absence (contour_a) or presence (contour_p) of center green coring level: the adjusted coring level for noise reduction in the contour signal contour: the contour output signal To the contour processing the following applies:

```
contour_=contour* + reconstructed green {add reconstructed green
   to contour*}
In case of absence of center green
begin
   Do_Coring(1.4*coringlevel) {execute the noise coring}
   contour_a=3*contour_a {amplify the contour signal 3 times}
end
else, in case of presence of green
begin
   Do_Coring(coring level) {no extra coring level needed}
   contour_p=contour_p {no amplification needed}
end
```

Figure 6:
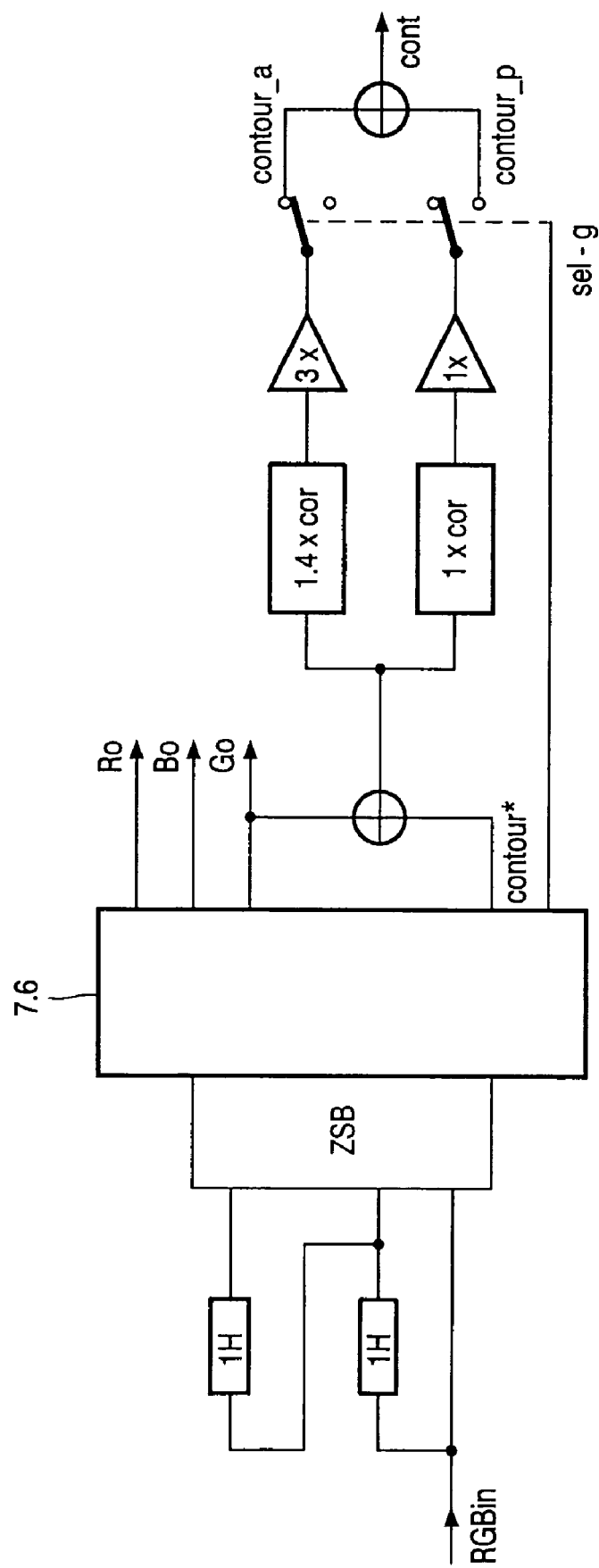
FIG. 6 shows a block diagram of a 5×3 parallel contour without green-green differences.

In FIG. 6 a block diagram of this particular filter without green-green differences is shown. The RGB input signal RGBin and two line-delayed version thereof are applied to an RGB reconstruction with green uniformity & parallel contour processing block 7.6 thru a zero switch box ZSB. the processing block 7.6 supplies RGB output signals Ro, Bo, and Go, a contour signal contour*, and a green present/absent select signal sel-g. The reconstructed green Go is added to the contour signal contour* as described above, and the result is applied to two parallel branches. An output signal contour_a of the upper branch, having a 1.4*coring block **1.4\*cor** and a 3× amplifier, is selected when green is absent. An output signal contour_p of the lower branch, having a 1*coring block **1\*cor** and a 1× amplifier, is selected when green is present. The result forms the contour signal cont.

By using only the contour signal of a zone plate scene, it can be seen that the horizontal contour is larger than the vertical one, but that there is a minimum of distortion. It should be noticed that any arbitrary 5×3 filter, which is of course not able to prevent the green-green differences, causes such differences between the horizontal and vertical contour amplitude.

An example of a 5×5 parallel contour filter without green-green differences is shown below.

Weights for green absent

| −0 | −2 | −0 | −2 | −0 |
|----|----|----|----|----|
| −2 | −0 | −2 | −0 | −2 |
| −0 | −2 | −0 | −2 | −0 |
| −2 | −0 | −2 | −0 | −2 |
| −0 | −2 | −0 | −2 | −0 | sigmawCR=24.

Weights for green present

| −1 | −0 | −2 | −0 | −1 |
|----|----|----|----|----|
| −0 | −3 | −0 | −3 | −0 |
| −2 | −0 | −0 | −0 | −2 |
| −0 | −3 | −0 | −3 | −0 |
| −1 | −0 | −2 | −0 | −1 | sigmawCR=24.

The absolute value of the sum of coefficients, sigmawCR, has already been adapted.

Figures 7, 9:
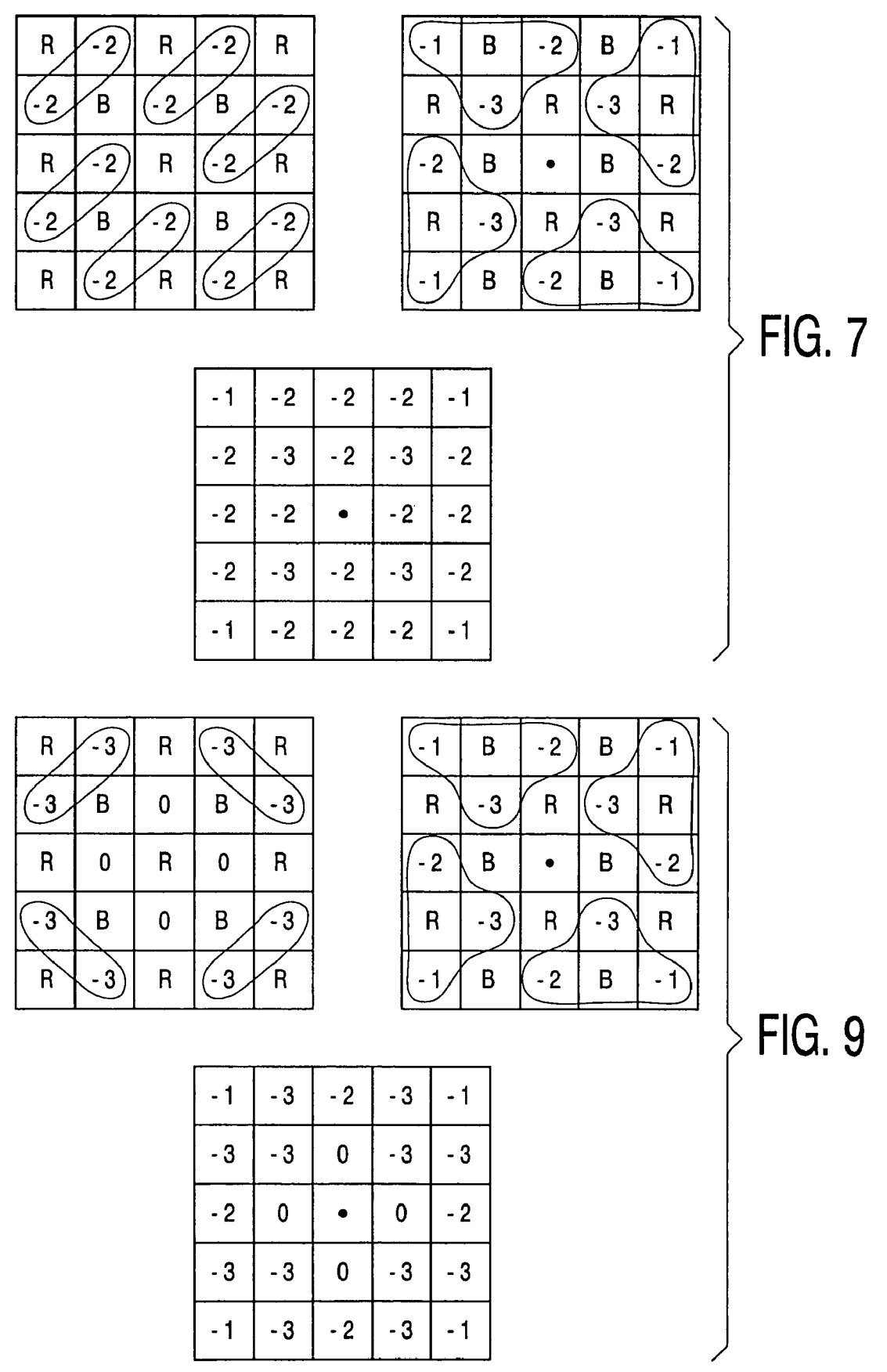

In FIG. 7, with the various sub-pictures showing the same situations as in FIG. 4, the fulfillment of rule 2 is tested. For the fulfillment of rule 2, in case of absence of green, a couple of 2 diagonal pixels is sufficient to eliminate the green-green differences. For the presence of center green, a group of 3 pixels is fulfilling rule 2. A couple with red vertical neighbors and coefficients of −2, −1 has as its counterpart a single pixel with a blue vertical neighbor and a coefficient of −3. Again the result of the subtraction is zero.

Figure 8:
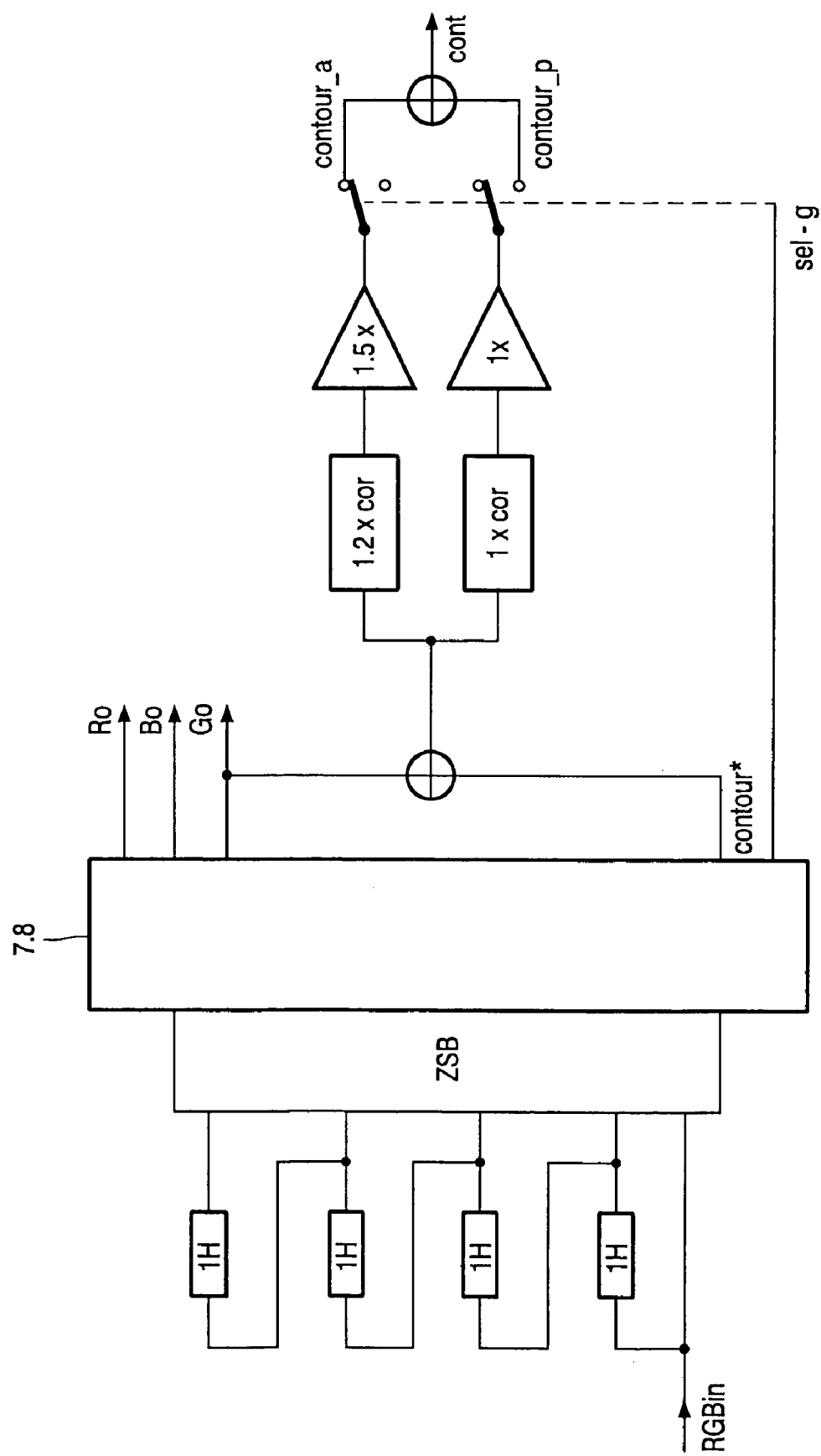
FIG. 8 shows a block diagram of a 5×5 parallel contour without green-green differences.

Checking the combination made it clear that the coring level and the amplitude of the filter for 'green is absent' have to be adapted. The coring level has to be multiplied by 1.2, and after that a gain of 1.5 is needed for the contour signal. For the filter where green is present, those factors are unity. See FIG. 8 for the block diagram, which is similar to that of FIG. 6, apart from the number of row delays and a consequential adaptation of the processing block 7.8.

To this 5×5 filter the same software can be applied as described above. The only differences concern coring level and gain in case center green is absent.

By using only the contour signal of a zone plate scene, it can be seen that it is symmetrical in the horizontal and vertical direction.

For the 5×5 filter configuration, also other weighting factors are possible in order to fulfil rule 2, in this case for absence of green. However, this second filter offers the same zone plate scene as for the previous one. By "the same" is meant that no differences can be seen.

Weights for green absent

| −0 | −3 | −0 | −3 | −0 |
|----|----|----|----|----|
| −3 | −0 | −0 | −0 | −3 |
| −0 | −0 | −0 | −0 | −0 |
| −3 | −0 | −0 | −0 | −3 |
| −0 | −3 | −0 | −3 | −0 | sigmawCR=24.

Weights for green present

| -1 | -0 | -2 | -0 | -1 |
|----|----|----|----|----|
| -0 | -3 | -0 | -3 | -0 |
| -2 | -0 | -0 | -0 | -2 |
| -0 | -3 | -0 | -3 | -0 |
| -1 | -0 | -2 | -0 | -1 | sigmawCR=24

The absolute value of the sum of the coefficients, sigmawCR, has already been adapted to 24. In FIG. 9 the fulfillment of rule 2 is tested, with the various sub-pictures showing the same situations as in FIG. 4.

Figure 10:
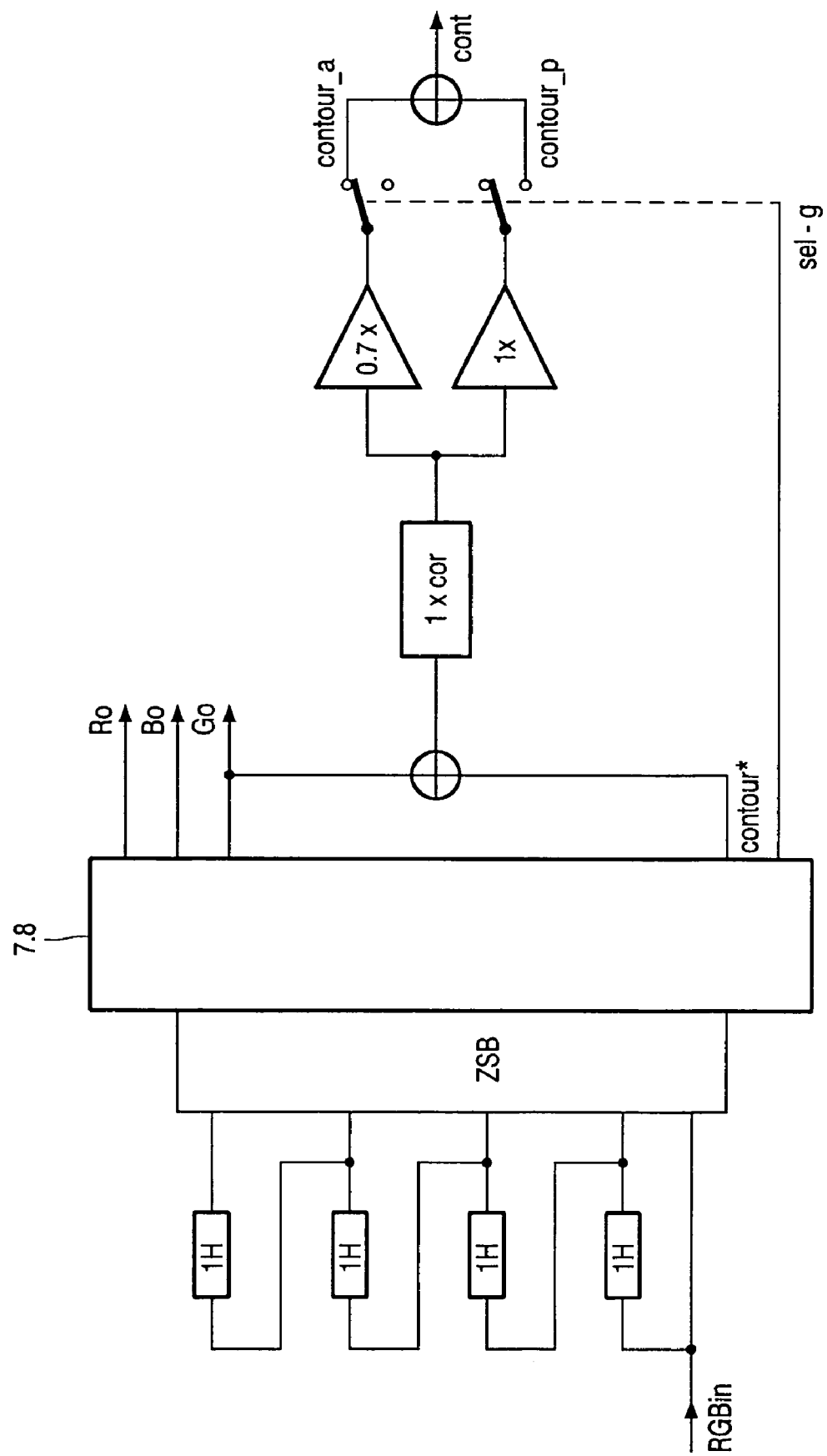
FIG. 10 shows a block diagram of a second 5×5 parallel contour without green-green differences.

The advantage of this second 5×5 filter is that no multiplier is needed for the coring level when green is absent. Only the amplitude for 'green is absent' has to be multiplied by 0.7 for a minimum distortion. See FIG. 10, which corresponds to FIG. 8 but for this difference.

Still another, a third, 5×5 filter configuration is possible. As a final example this one will be elucidated in order to show how to play with rule 2. For absent green this third filter has the same relative weights as the previous second one. The weights for 'green is present' will be changed now.

Weights for green absent

| -0 | -2 | -0 | -2 | -0 |
|----|----|----|----|----|
| -2 | -0 | -0 | -0 | -2 |
| -0 | -0 | -0 | -0 | -0 |
| -2 | -0 | -0 | -0 | -2 |
| -0 | -2 | -0 | -2 | -0 | sigmawCR=16.

Weights for green present

| -1 | -0 | -1 | -0 | -1 |
|----|----|----|----|----|
| -0 | -2 | -0 | -2 | -0 |
| -1 | -0 | -0 | -0 | -1 |
| -0 | -2 | -0 | -2 | -0 |
| -1 | -0 | -1 | -0 | -1 | sigmawCR=16

Figures 11, 13:
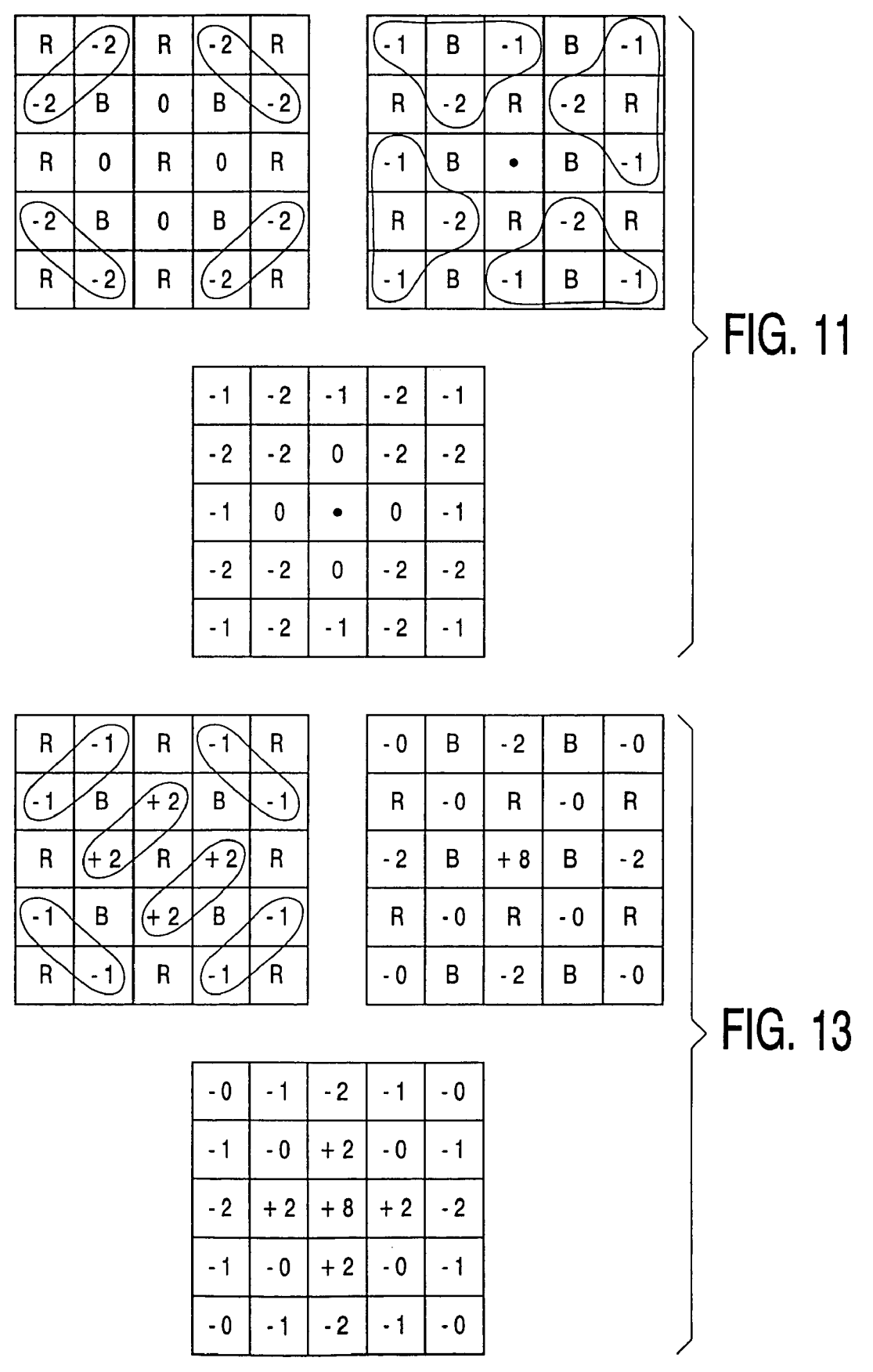

The absolute value of the sum of the coefficients, sigmawCR, has already been adapted to 16. In FIG. 11 the fulfillment of rule 2 is tested, with the various sub-pictures showing the same situations as in FIG. 4.

Figure 12:
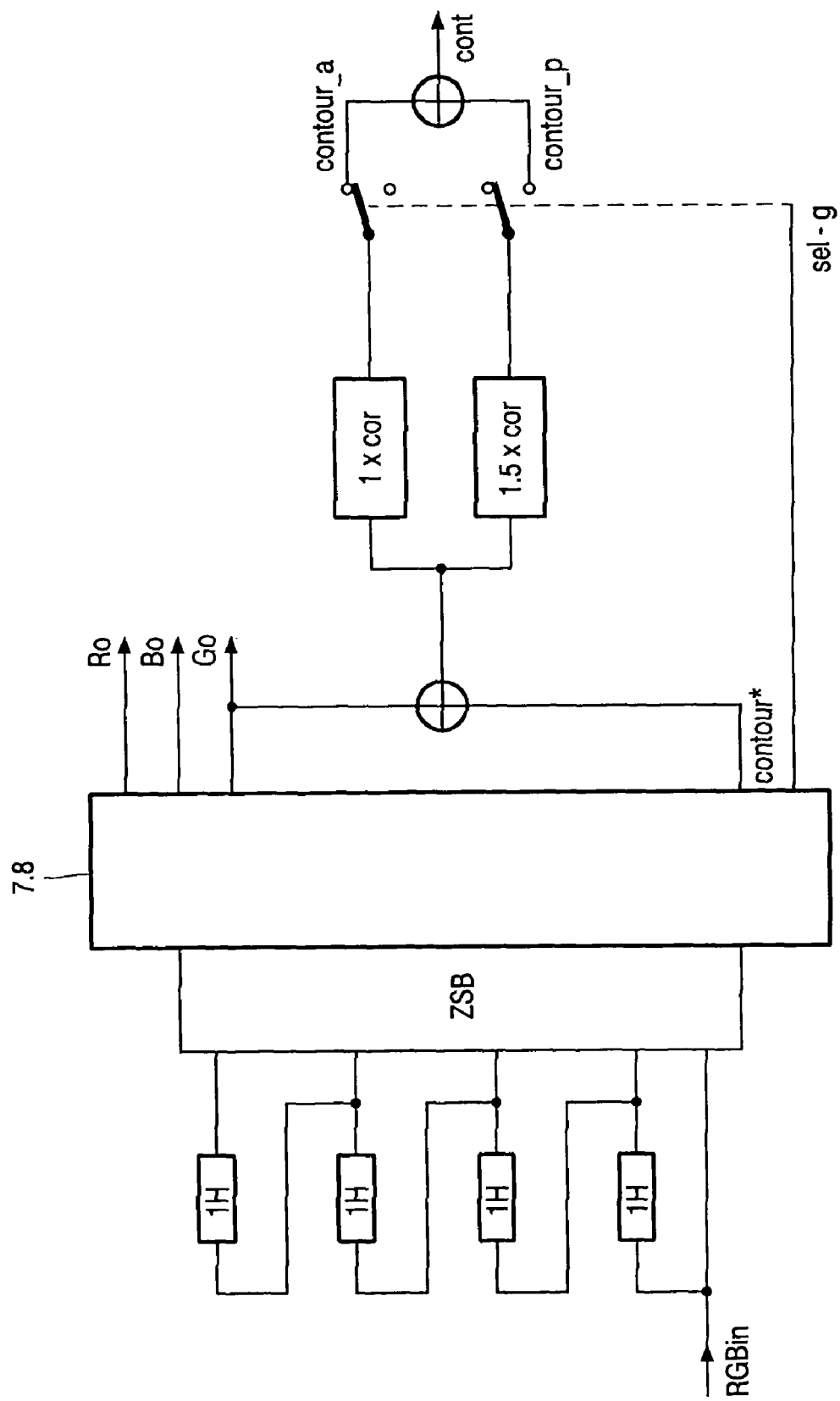
FIG. 12 shows a block diagram of a third 5×5 parallel contour without green-green differences.

The advantage of this third 5×5 filter is that no multiplier is needed for the gain adaptation. Only the coring level for 'green is present' has to be multiplied by 1.5 for an equal noise reduction. In FIG. 12 the block diagram of this third 5×5 filter is shown. But for the coring levels, FIG. 12 corresponds to FIGS. 8 and 10.

Finally a 5×5 aliasing free contour filter is tested, its coefficients are splitted in weighting factors for 'center green is absent' and for 'center green is present'.

When green is absent the following coefficients apply:

| -0 | -1 | -0 | -1 | -0 |
|----|----|----|----|----|
| -1 | -0 | +2 | -0 | -1 |
| -0 | +2 | -0 | +2 | -0 |
| -1 | -0 | +2 | -0 | -1 |
| -0 | -1 | -0 | -1 | -0 | sigmawCR=8

When green is present these coefficients apply.

| -0 | -0 | -2 | -0 | -0 |
|----|----|----|----|----|
| -0 | -0 | -0 | -0 | -0 |
| -2 | -0 | +8 | -0 | -2 |
| -0 | -0 | -0 | -0 | -0 |
| -0 | -0 | -2 | -0 | -0 | sigmawCR=8

The absolute value of the sum of the coefficients, sigmawCR, has already been adapted.

Simulation of only the filter for which green is present, however, makes it clear that it does eliminate the green-green differences. The explanation is that only non-zero coefficients are present at green locations with the same colored (red or blue) vertical neighbor. In FIG. 13 non-zero coefficients are only present at green locations with a red vertical neighbor. This means that (in low frequency scene parts) the involved green pixels will have the same error. The +8 coefficient and the four −2 coefficients will together eliminate this error to a zero green-green difference in the output signal.

This also means that rules 1 and 2 can be replaced by an alternative rule for the center green filter configuration, the alternative rule being: the sum of coefficients, having the same first vertical neighbor color, is zero, and each filter coefficients with a second vertical neighbor color different from said first color is zero.

In more general terms this can be expressed as follows: the sum of coefficients in a subgroup comprising every second row of said array of filter coefficients is zero, and each filter coefficients not being a part of said subgroup is 0.

By using FIG. 13, with the various sub-pictures showing the same situations as in FIG. 4, it can be seen that the contour filter according to the invention fulfils the above alternative rule. Thereby a filter that both removes aliasing and green non-uniformity has been obtained.

For a near white luminance signal in the reconstruction block, derived from the RGB pixels of the image sensor, the matrix and white balance parameters have to be taken into account. Because the matrix and white balance are located after the reconstruction, some adaptation is needed of the incoming red and blue colors. For that purpose the parameters SmartGcntrlR and SmartGcntrlB are used to control the red and blue amplitudes so that they match with green and result in a near white luminance signal Yn.

Figure 14:
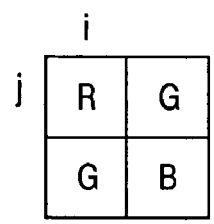
FIG. 14 shows an RGB Bayer luminance pixel.

Referring to FIG. 14, the following applies to this Yn-signal in case of red and blue pixels:

$Yn[i,j]$=SmartGcntrl$R$*red $Yn[i+1,j+1]$=SmartGcntrl$R$*blue

In case of green pixels, Yn is equal to green.

$$Yn[i+1,j]=green$$

$$Yn[i,j+1]=green$$

Figure 15:
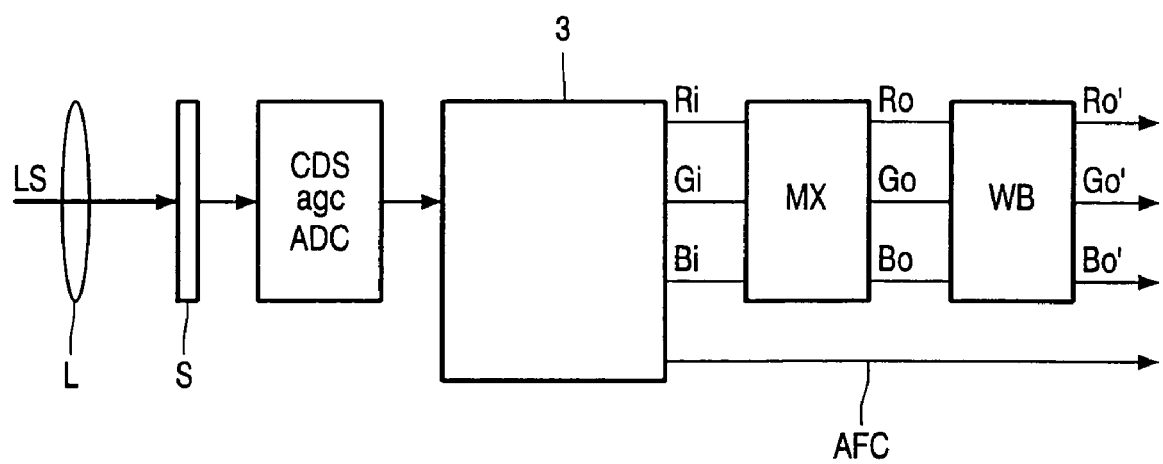
FIG. 15 shows the RGB and contour reconstruction, matrix and white balance of a RGB Bayer color camera.

In FIG. 15 a simplified block diagram is shown with the RGB and aliasing free contour reconstruction, followed by the matrix and the white balance. This block diagram is used to define the parameters in the next formulas for the calculation of SmartGcntrlr/B. Light LS from a scene is passed to an RGB Bayer sensor S thru a lens L. An output signal from the sensor S is applied to a CDS (correlated double sampling, agc (automatic gain control) and ADC (analog to digital conversion) processing block 1. An output of the processing block 1 is applied to an RGB reconstruction and parallel contour processing block 3. The processing block 3 outputs reconstructed RGB signals Ri, Gi and Bi, as well as an aliasing-free contour signal AFC. The reconstructed RGB signals Ri, Gi and Bi are applied to a matrix circuit MX that produces signals Ro, Go and Bo, which are applied to a white balance circuit WB to furnish output signals Ro', Go' and Bo'.

Every RGB Bayer color sensor needs a correction of its primary colors to the EBU primaries that are accustomed in worldwide television sets and PC monitors. The correction is realized with a matrix, which requires nine multipliers.

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \times \begin{bmatrix} Ri \\ Gi \\ Bi \end{bmatrix}$$

Ro, Go, Bo are the output RGB signals of the matrix, and Ri, Gi, Bi are the input signals.

With the white balance after the matrix, the RGB signals become:

$$Ro'=awbR \cdot Ro$$

$$Go'=Go$$

$$Bo'=awbB \cdot Bo$$

where awbR and awbB are the white balance parameters. (According to the World Gray Assumption method (WGA) it applies that awbR=totalGreen/totalRed and awbB=totalGreen/totalBlue, where totalRed, totalGreen and totalBlue represent the total of the RGB color amplitudes measured over the whole scene.) Both actions, the matrix together with the white balance, offer the desired white reproduction. The Ro', Go', Bo' signals now guarantee an EBU color reproduction.

For a proper near white luminance signal Yn the opposite has to be done. Therefore, imagine a scene with colors according to the EBU color space and a color temperature equal to D65 white. With the inverse matrix of the one shown below the color space of the sensor is achieved:

$$\begin{bmatrix} Rii \\ Gii \\ Bii \end{bmatrix} = \begin{bmatrix} b11 & b12 & b13 \\ b21 & b22 & b23 \\ b31 & b32 & b33 \end{bmatrix} \times \begin{bmatrix} Ri \\ Gi \\ Bi \end{bmatrix}$$

where Rii, Gii, Bii represent the colors of an EBU scene, and Ri, Gi, Bi represent the colors of the sensor.

For the luminance signal Yn only the white reproduction of the inverse matrix is of interest, being represented by the sum of the matrix coefficients of each color.

$$\Sigma Rii = b11 + b12 + b13$$

$$\Sigma Gii = b21 + b22 + b23$$

$$\Sigma Bii = b31 + b32 + b33$$

Besides that, the color temperature of the scene need not be D65 white. Inclusive of an arbitrary color temperature, the sum of the matrix coefficients become:

$$\Sigma Riwb = Rpresetgain \cdot b11 + Gpresetgain \cdot b12 + Bpresetgain \cdot b13$$

$$\Sigma Giwb = Rpresetgain \cdot b21 + Gpresetgain \cdot b22 + Bpresetgain \cdot b23$$

$$\Sigma Biwb = Rpresetgain \cdot b31 + Gpresetgain \cdot b32 + Bpresetgain \cdot b33$$

where Xpresetgain (X=R, G or B) represents the gain factors for transferring D65 white to that arbitrary color temperature. (For D65 white all Xpresetgain parameters are one.)

To the SmartGcntrlR/B parameters used in Yn[i,j] and Yn[i+1,j+1] (see formula below) it applies that:

$$SmartGcntrlR = \frac{\sum Giwb}{\sum Riwb}$$

$$SmartGcntrlB = \frac{\sum Giwb}{\sum Riwb}$$

The parameter ΣGiwb is used as nominator because the green amplitude is regarded as a reference, which applies to the white balance as well.

The above formulas can thus be written in such a way that the measured white balance parameters awbR/B can be applied. It is known that, $$\frac{Gpresetgain}{Rpresetgain} = awbR = \frac{Gtotal}{Rtotal}$$

$$\frac{Gpresetgain}{Bpresetgain} = awbB = \frac{Gtotal}{Btotal}$$

therefore $$\Sigma Riwb = Gpresetgain \cdot \left( \frac{b11}{awbR} + b21 + \frac{b13}{awbB} \right)$$

$$\Sigma Giwb = Gpresetgain \cdot \left( \frac{b21}{awbR} + b22 + \frac{b23}{awbB} \right)$$

$$\Sigma Biwb = Gpresetgain \cdot \left( \frac{b31}{awbR} + b23 + \frac{b33}{awbB} \right)$$

As the ΣXiwb-values are divided above, the parameter Gpresetgain is not important, because Gpresetgain/Gpresetgain=1. Therefore the next formula is sufficient for calculating the desired ΣXiwb-values:

$$\Sigma Riwb = \left(\frac{b11}{awbR} + b21 + \frac{b13}{awbB}\right)$$

$$\Sigma Giwb = \left(\frac{b21}{awbR} + b22 + \frac{b23}{awbB}\right)$$

$$\Sigma Biwb = \left(\frac{b31}{awbR} + b23 + \frac{b33}{awbB}\right)$$

Thus, a luminance signal Yn has become available with equal RGB signal amplitudes for white scene colors, thereby being independent of the sensor matrix and the color temperature of the scene. This signal Yn can be applied for the aliasing free contour filter.

The question raised is whether Yn really should be composed with the SmartGcntrlR/B parameters for the red and blue pixels and the answer depends on the desired performance. If the best performance of the aliasing free contour filter is wanted, then the SmartGcntrlR/B parameters should be applied. If a somewhat lower performance is accepted, i.e. some distortions are allowed, then those parameters can be neglected.

Figure 16:
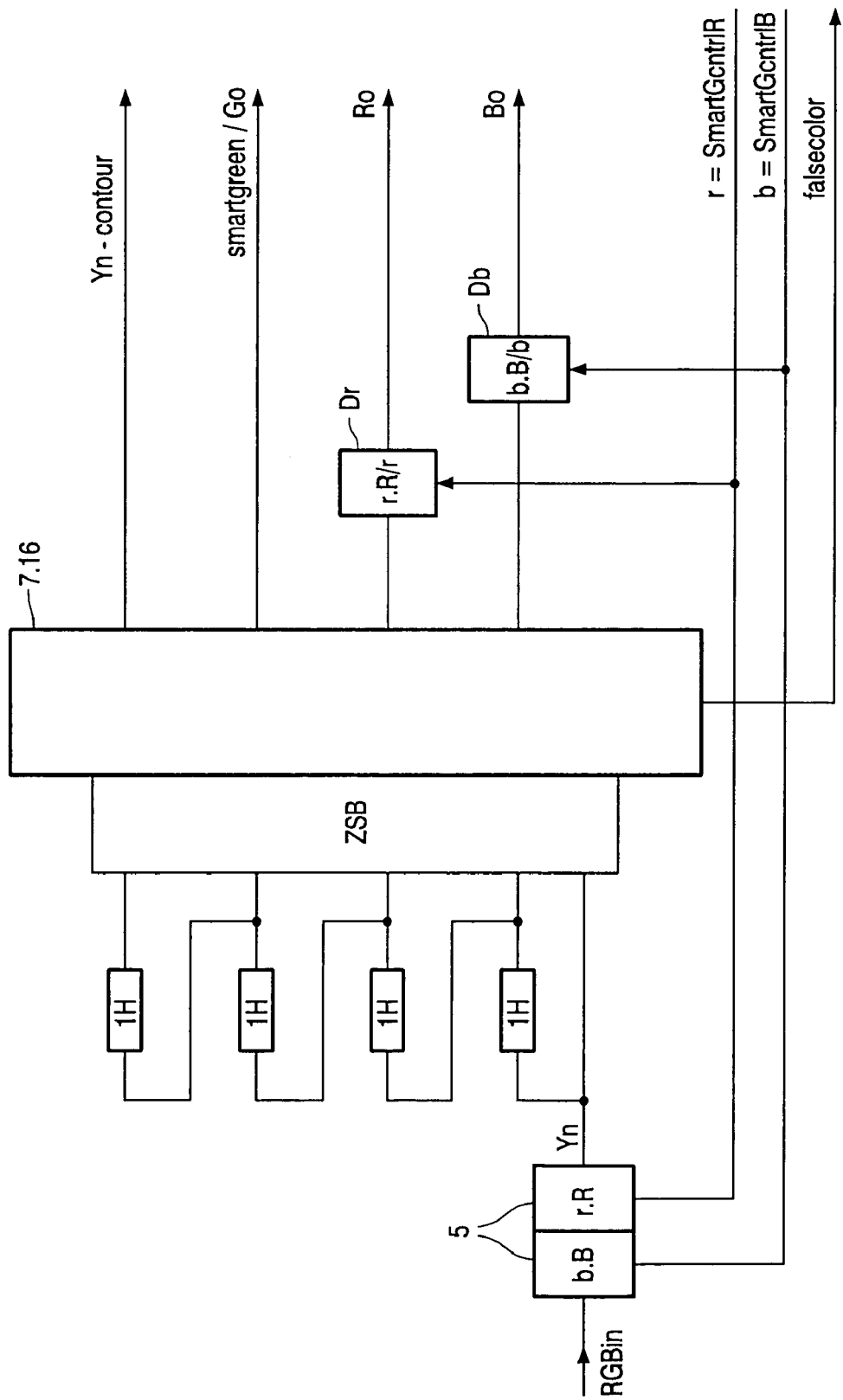
FIG. 16 shows a block diagram for RGB reconstruction and parallel contour filtering.

FIG. 16 shows the block diagram of the RGB reconstruction and parallel contour filtering. Yn is the multiplexed RGB-signal of the sensor where R has been multiplied with SmartcntrlR, and B with SmartcntrlB, in a preprocessing block 5. This Yn-signal is used for parallel contour only, while Yn is splitted into three colors, red=R*SmartcntrlR, green=G and Blue=B*SmartcntrlB, via the zero switchbox ZSB. Then, a conventional Laplacian RGB reconstruction method with or without smart green, but in any case with green-uniformity restoration, is applied and, if desired, with the red and blue false color detector in an RGB reconstruction with/without smartgreen and green uniformity & parallel contour processing block 7.16. If smart green (smartgreen1) is applied, then the so called RBc signal in the median filter already fits with R*SmartGcntrlR and B*SmartGcntrlB.

By dividing the reconstructed red and blue signals in dividers Dr and Db by SmartGcntrlR and SmartGcntrlB, respectively, the original red and blue sensor amplitudes are restored. This means that the usually applied matrix, white balance and gamma functions can be maintained. In digital circuit design, multipliers are preferred to dividers. Therefore, in order to avoid the divider circuits, the best way is to let the computer of the camera calculate I/SmartcntrlR and I/SmartcntrlB. Next, via two separate wires, those values can be offered to two multipliers. The Ro-amplitude then becomes equal to the R-amplitude of the input signal (SmartcntrlR*R*(1/SmartcntrlR=R). The very same applies to the Bo-amplitude.

It should be noticed that the parameters SmartcntrlR/B have been determined in a measurement cycle before the photograph is taken or in a continuous way in case of video mode.

Although the present invention has been described in connection with the preferred embodiment, it is not intended to be limited to the specific form set forth herein. On the contrary, it is intended to cover such alternatives, modifications, and equivalents, as can be reasonably included within the scope of the invention as defined by the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A filter configured to provide contour information from an array of pixel values representing an image, the array comprising a first and a second group of pixels, the first group of pixels representing at least a part of the image optically filtered with a filter having a first color, and the second group of pixels representing at least a part of the image optically filtered with one or more filters having one or more second colors, each pixel in the first group having a vertical and a horizontal neighboring pixel of the second group the filter comprising:

a converter configured to convert the array of pixel values to a zero switched array, where the pixel values of the pixels in the second group are replaced by zero; and a contour filter configured to filter the zero switched array and output the contour information, the contour filter comprising:

a definition generator configured to define a sub array in the array of pixels, for each pixel in the zero switched array, where the pixel to be filtered is positioned in a pre-determined position within the sub array;

a first array of filter coefficients for use in the contour filter when the pixel to be filtered is a pixel from the first group of pixels, and a second array of filter coefficients for use in the contour filter when the pixel to be filtered is a pixel from the second group of pixels;

a comparator configured to match noise of two separate filters comprising each of the first and the second filter coefficients; and a calculator configured to calculate a filtered pixel value.

2. A contour filter according to claim 1, wherein the sub array has an odd number of rows and columns and the predetermined position of the pixel to be filtered is in the center of the sub array.

3. A contour filter according to claim 1, further comprising an interpolator configured to perform an interpolation of missing color pixels at the same time as the filtering.

4. A contour filter according to claim 1, wherein the comparator is adapted to perform the matching by adjusting the coring level of each of the filters.

5. A filter configured to provide contour information from an array of pixel values representing an image, the array comprising a first and a second group of pixels, the first group of pixels representing at least a part of the image optically filtered with a filter having a first color, and the second group of pixels representing at least a part of the image optically filtered with one or more filters having one or more second colors, each pixel in the first group having a vertical and a horizontal neighboring pixel of the second group, the filter comprising:

a converter configured to convert the array of pixel values to a zero switched array, where the pixel values of the pixels of the second group are replaced by zero; and a contour filter configured to filter the zero switched array and output the contour information, the contour filter comprising:

a definition generator configured to generate a pixel in the zero switched array, defining a sub array in the array of pixels where the pixel to be filtered is positioned in a pre-determined position within the sub array;

a first array of filter coefficients for use in the contour filter when the pixel to be filtered is a pixel from the first group of pixels, and a second array of filter coefficients for use in the contour filter when the pixel to be filtered is a pixel from the second group of pixels, the first and the second arrays having the same dimensions as the sub array and fulfilling a rule whereby the sum of coefficients in a subgroup comprising every second row of the array of filter coefficients is zero and each filter coefficient not being a part of the subgroup is between −0.1 and 0.1; and a calculator configured to calculate a filtered pixel value, wherein the calculation is performed by multiplying each coefficient in the first or second array of filter coefficients with each correspondingly placed pixel in the sub array from either the first or second group of pixels and adding the result of each multiplication to obtain a filtered pixel value for each of the sub arrays of pixels.

6. A filter configured to provide contour information from an array of pixel values representing an image, the array comprising a first and a second group of pixels, the first group of pixels representing at least a part of the image optically filtered with a filter having a first color, and the second group of pixels representing at least a part of the image optically filtered with one or more filters having one or more second colors, each pixel in the first group having a vertical and a horizontal neighboring pixel of the second group, the filter comprising:

a converter configured to convert the array of pixel values to a zero switched array, where the pixel values of the pixels in the second group are replaced by zero; and a contour filter configured to filter the zero switched array and output the contour information, the contour filter comprising:

a definition generator configured to define a sub array in the array of pixels, for each pixel in the zero switched array, where the pixel to be filtered is positioned in a pre-determined position within the sub array;

a first array of filter coefficients for use in the contour filter when the pixel to be filtered is a pixel from the first group of pixels, and a second array of filter coefficients for use in the contour filter when the pixel to be filtered is a pixel from the second group of pixels; and a calculator configured to calculate a filtered pixel value;

wherein the first group of pixels consists of every second pixel in each row and column of the array of pixel values, and the first and second filter arrays are combined to a single filter array, wherein the first and second arrays have the same dimensions, for each position of the first and second arrays, apart from the predetermined position, at least one of the first and second array has a filter coefficient being at least substantially zero, the single array having dimensions equal to those of the first and second arrays, and the filter coefficient of each position of the single array being the sum of the corresponding coefficients of the first and second arrays.

7. A contour filter according to claim 6, the contour filter being a 5×2 filter, the coefficients having mutual ratios being substantially defined by:

| −x ± A | −x ± B | 0 ± C | −x ± D | −x ± E |
| −x ± F | −x ± G | 0 | −x ± H | −x ± I | or the contour filter being a 5×3 filter, the coefficients having mutual ratios being substantially defined by:

| −2x ± A | −3x ± B | −2x ± C | −3x ± D | −2x ± E |
| −6x ± F | −6x ± G | 0 | −6x ± I | −6x ± J |
| −2x ± K | −3x ± L | −2x ± M | −3x ± N | −2x ± O | or the contour filter being a 5×5 filter, the coefficients having mutual ratios being substantially defined by:

| −x ± A | −2x ± B | −2x ± C | −2x ± D | −x ± E |
| −2x ± F | −3x ± G | −2x ± H | −3x ± I | −2x ± J |
| −2x ± K | −2x ± L | 0 | −2x ± M | −2x ± N |
| −2x ± O | −3x ± P | −2x ± Q | −3x ± R | −2x ± S |
| −x ± T | −2x ± U | −2x ± V | −2x ± X | −x ± Y | or the contour filter being a 5×5 filter, the coefficients having mutual ratios being substantially defined by:

| −x ± A | −3x ± B | −2x ± C | −3x ± D | −x ± E |
| −3x ± F | −3x ± G | 0 ± H | −3x ± I | −3x ± J |
| −2x ± K | 0 ± L | 0 | 0 ± M | −2x ± N |
| −3x ± O | −3x ± P | 0 ± Q | −3x ± R | −3x ± S |
| −z ± T | −3x ± U | −2x ± V | −3x ± X | −x ± Y | or the contour filter being a 5×5 filter, the coefficients having mutual ratios being substantially defined by:

| −x ± A | −2x ± B | −x ± C | −2x ± D | −x ± E |
| −2x ± F | −2x ± G | 0 ± H | −2x ± I | −2x ± J |
| −x ± K | 0 ± L | 0 | 0 ± M | −x ± N |
| −2x ± O | −2x ± P | 0 ± Q | −2x ± R | −2x ± S |
| −x ± T | −2x ± U | −x ± V | −2x ± X | −x ± Y | or the contour filter being a 5×5 filter, the coefficients having mutual ratios being substantially defined by:

| −0 ± A | −1x ± B | −2x ± C | −1x ± D | −0 ± E |
| −1x ± F | −0 ± G | +2x ± H | −0 ± I | −1x ± J |
| −2x ± K | +2x ± L | +8x ± M | +2x ± N | −2x ± O |
| −1x ± P | −0 ± Q | +2x ± R | −0 ± S | −1x ± T |
| −0 ± U | −1x ± V | −2x ± X | −1x ± Y | −0 ± Z | where x is a real number and the value of each of A, B, C, D, E, F, G, H, I, J, K, L, M, N, O, P, Q, R, S, T, U, V, X, Y, and Z is smaller than x.

8. The contour filter of claim 7, wherein the value of each of A, B, C, D, E, F, G, H, I, J, K, L, M, N, O, P, Q, R, S, T, U, V, X, Y, and Z is between 0 and 0.1x.

9. A method for a filter to provide contour information from an array of pixel values representing an image, the array comprising a first and a second group of pixels, the first group of pixels representing parts of the image optically filtered with a filter having a first color, and the second group of pixels representing parts of the image optically filtered with one or more filters having one or more second colors, each pixel in the first group having a vertical and horizontal neighboring pixel of the second group comprising:

converting, using a converter, the array of pixel values to a zero switched array, where the pixel values of the pixels in the second group are replaced by zero; and contour filtering, using a contour filter, the zero switched array and outputting the contour information, the contour filtering comprising:

defining, for each pixel in the zero switched array, a sub array in the array of pixels where a pixel to be filtered is positioned in a pre-determined position within the sub array;

using a first array of filter coefficients when the pixel to be filtered is a pixel from the first group of pixels, and a second array of filter coefficients when the pixel to be filtered is a pixel from the second group of pixels;

matching noise of two separate filters comprising each of the first and the second filter coefficients; and calculating a filtered pixel value by multiplying each coefficient in the first or second array of filter coefficients with each correspondingly placed pixel in the sub array from either the first or second group of pixels and adding the result of each multiplication to obtain a filtered pixel value for each of the sub arrays of pixels.

10. A method for providing contour information from an array of pixel values representing an image, the array comprising a first and a second group of pixels comprising:

converting, using a converter, the array of pixel values to a zero switched array, where the pixel values of the pixels in the second group are replaced by zero; and contour filtering, using a contour filter, the zero switched array and outputting the contour information, the contour filtering comprising:

defining, for each pixel in the zero switched array, a sub array in the array of pixels where a pixel to be filtered is positioned in a pre-determined position within the sub array;

using a first array of filter coefficients when the pixel to be filtered is a pixel from the first group of pixels, and a second array of filter coefficients when the pixel to be filtered is a pixel from the second group of pixels, the first and second arrays having the same dimensions as the sub array and fulfilling the rule that the sum of coefficients in a subgroup comprising every second row of the array of filter coefficients is zero and each filter coefficient not a part of the subgroup is between $-0.1$ and $0.1$; and calculating a filtered pixel value, the calculation performed by multiplying each coefficient in the first or second array of filter coefficients with each correspondingly placed pixel in the sub array from either the first or second group of pixels and adding the result of each equation to obtain a filtered pixel value for each of the sub arrays of pixels.

* * * * *